United States Patent
Sakamoto

(10) Patent No.: US 10,185,879 B2
(45) Date of Patent: Jan. 22, 2019

(54) IMAGE PROCESSING DEVICE

(71) Applicant: HONDA MOTOR CO., LTD., Minato-ku, Tokyo (JP)

(72) Inventor: Yosuke Sakamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/658,482

(22) Filed: Mar. 16, 2015

(65) Prior Publication Data

US 2015/0294163 A1 Oct. 15, 2015

(30) Foreign Application Priority Data

Apr. 15, 2014 (JP) .................... 2014-083701

(51) Int. Cl.
G06K 9/00 (2006.01)
G06T 7/12 (2017.01)
G06T 7/136 (2017.01)

(52) U.S. Cl.
CPC .......... *G06K 9/00798* (2013.01); *G06T 7/12* (2017.01); *G06T 7/136* (2017.01); *G06T 2207/30256* (2013.01)

(58) Field of Classification Search
None
See application file for complete search history.

(56) References Cited

U.S. PATENT DOCUMENTS

| | | | |
|---|---|---|---|
| 6,819,779 B1 * | 11/2004 | Nichani | G06K 9/00798 382/104 |
| 7,209,832 B2 | 4/2007 | Yamamoto et al. | |
| 8,548,200 B2 | 10/2013 | Suzuki et al. | |
| 9,436,878 B2 | 9/2016 | Sakamoto | |
| 9,489,585 B2 | 11/2016 | Sakamoto | |
| 2011/0200258 A1* | 8/2011 | Suzuki | G06K 9/00798 382/199 |
| 2012/0072080 A1* | 3/2012 | Jeromin | G06K 9/00798 701/49 |

FOREIGN PATENT DOCUMENTS

| | | |
|---|---|---|
| DE | 102011004006 A1 | 3/2012 |
| DE | 102015205685 A1 | 10/2015 |
| DE | 102015206546 A1 | 10/2015 |

(Continued)

OTHER PUBLICATIONS

Office Action dated Mar. 14, 2017 issued in the corresponding Japanese Patent Application 2014-083701.

(Continued)

*Primary Examiner* — Vu Le
*Assistant Examiner* — Guillermo M Rivera-Martinez
(74) *Attorney, Agent, or Firm* — Carrier Blackman & Associates, P.C.; Joseph P. Carrier; Jeffrey T. Gedeon

(57) ABSTRACT

Provided is an image processing device in which a region targeted for edge extraction of a taken image is divided into a plurality of partial regions 11(1) to 11(7) for which threshold values for edge extraction different from each other are set, respectively. An edge extraction unit 5, which extracts edges from the region targeted for edge extraction, performs processing of extracting the edges in the partial regions 11(1) to 11(7) by using the threshold values set so as to correspond to the each of the partial regions 11(1) to 11(7).

14 Claims, 4 Drawing Sheets

(56) References Cited

FOREIGN PATENT DOCUMENTS

| JP | 09-167239 A | 6/1997 |
|----|-------------|--------|
| JP | H09-288737 A | 11/1997 |
| JP | 2005-157670 A | 6/2005 |
| JP | 2006-031365 A | 2/2006 |

OTHER PUBLICATIONS

Office Action dated Feb. 6, 2017 issued in the counterpart German Patent Application No. 10 2015 206 654.1 with English translation.
Search Report dated Feb. 6, 2017 issued in the counterpart German Patent Application No. 10 2015 206 654.1 with English translation.
Office Action dated Nov. 7, 2017 issued in the counterpart Japanese Patent Application 2014-083701.

* cited by examiner

IMAGE PROCESSING DEVICE

BACKGROUND OF THE INVENTION

1. Field of the Invention

The present invention relates to an image processing device which uses edges extracted from a taken image to recognize an image of an object to be detected such as a lane mark.

2. Description of the Related Art

Conventionally, it is generally performed that edges are extracted from an image taken by an imaging device to recognize various images to be detected by using the edges.

For example, Japanese Patent Application Laid-Open No. H09-2737 (hereinafter, referred to as "Patent Document 1") describes an invention in which a binary image is generated, by extracting edges as candidates for a white line on a road surface from an image taken by an imaging device mounted on a vehicle to recognize the white line on the road surface based on the binary image.

In this case, the edges as candidates for the white line are extracted by comparing the pixel values of an edge image representing a change in the luminance value in the taken image with a given threshold value.

In addition, Patent Document 1 describes a technique of changing the foregoing threshold values in both of the right and left regions according to the edge count value in the right region of the taken image or the edge count value in the left region of the taken image.

In an image taken by an imaging device, the brightness of the image (the average luminance) relatively largely differs in each part according to the influence of a structure, the weather, or the like in the surrounding environment of the imaging device in some cases. For example, in the case of taking an image of the front view of the own vehicle by using the imaging device, such a situation may sometimes occur that a part of the taken image is relatively dark due to a shadow of a structure such as a fence while other parts of the taken image are relatively light.

In such a situation, in the case of extracting edges from the taken image, setting the same threshold value for edge extraction in the entire image region where edges are to be extracted might cause a problem that the same type of edges (for example, the edges of a lane mark on a road surface) can be extracted in some parts of the image region while the edges cannot be extracted in other parts of the image region.

In the conventional technique as in Patent Document 1, however, the threshold value for edge extraction is set to the same value in the entire image region where edges are to be extracted.

This easily causes a problem such that an edge is not extracted in an image region where an edge to be extracted actually exists or a number of unnecessary edges are extracted in a region where there is no edge to be extracted.

SUMMARY OF THE INVENTION

The present invention has been made in view of the above background. Therefore, it is an object of the present invention to provide an image processing device capable of extracting required edges from a taken image with high reliability.

In order to achieve the above object, the present invention provides an image processing device comprising an edge extraction unit which extracts an edge from a taken image by comparing a pixel value change in the image taken by an imaging device which takes an image of a monitoring region with a given threshold value, wherein a region targeted for edge extraction, which is a region in the taken image in which the edge extraction unit performs a processing of extracting the edge from the taken image, is divided into a plurality of partial regions for which threshold values different from each other are set, respectively, and wherein the edge extraction unit is configured to perform the processing of extracting the edge in each of the partial regions of the region targeted for edge extraction by using the threshold values set corresponding to the partial region (First aspect of the invention).

According to the first aspect of the invention, the threshold values different from each other are set for the partial regions of the region targeted for edge extraction, respectively. Therefore, the edge extraction unit is able to perform edge extraction in each partial region by using the threshold value suitable for the state (the distribution state, the average pixel value, etc.) of the pixel values of the entire partial region.

For example, it is possible to use threshold values different from each other for a relatively dark partial region and a relatively light partial region to extract edges in the partial regions in the region targeted for edge extraction.

Therefore, according to the first invention, required edges are able to be extracted from a taken image with high reliability.

The region targeted for edge extraction in the first invention may be either the entire or a part of region of the taken image. Furthermore, the region targeted for edge extraction and each of the partial region may be either a single continuous region or a region composed of a plurality of regions separated from each other.

In one aspect of the foregoing first invention, preferably the threshold values are set so that a threshold value in a partial region where an image of a portion which is at a relatively long distance from the imaging device in a real space is projected is smaller than a threshold value in a partial region where an image of a portion which is at a relatively short distance from the imaging device is projected, among the plurality of partial regions (Second aspect of the invention).

Specifically, the image of a portion which is at a relatively long distance from the imaging device tends to be unclear in comparison with the image of a portion which is at a relatively short distance from the imaging device. In the second aspect of the invention, the threshold values are set for the partial regions as described above with consideration for the above point.

This enables the edge extraction in each partial region to be appropriately performed independently of the distance from the imaging device of the portion which is shown in the partial region.

Furthermore, in the first or second aspect of the invention, the image processing device further comprises a threshold updating unit configured to update the threshold values in one or more respective partial regions among the plurality of partial regions according to the number of edges extracted by the edge extraction unit in local regions of the partial regions concerned (Third aspect of the invention).

The term "local regions of one arbitrary partial region" means a part of the partial region. The same applies to fourth to seventh aspect of the invention described later.

According to the third aspect of the invention, the threshold values of one or more respective partial regions are updated according to the number of edges extracted in the local regions of the partial regions. For example, in the case where edges were extracted in the local regions by using a certain threshold value, the threshold value of the partial region having local regions for making it easy to extract edges can be decreased if the number of extracted edges is smaller than the given number (if the number of extracted edges is too small), or the threshold value of the partial region having local regions for making it difficult to extract edges can be increased if the number of extracted edges is greater than the given number (if the number of extracted edges is too many).

Therefore, the threshold value of each partial region is able to be appropriately updated in response to a change in the image state or the like in each of the one or more partial regions.

Moreover, the threshold value in each of the one or more partial regions is updated according to the number of extracted edges in the local regions which is a part of the partial region. Accordingly, the processing for updating the threshold value of the partial region is able to be efficiently performed with a small arithmetic load.

Moreover, in the first or second aspect of the invention, the following may be adopted as a more specific form.

Specifically, in the first or second aspect of the invention, for example, in the case where the monitoring region whose image is taken by the imaging device is a region including a vehicle traveling road surface, the image processing device may further comprise: a lane mark recognition unit configured to recognize an image of lane marks on the vehicle traveling road surface by using the edges extracted by the edge extraction unit in the region targeted for edge extraction including an image of the vehicle traveling road surface; and a threshold updating unit configured to update the threshold values in the one or more respective partial regions, in which at least the image of the lane marks is likely to be shown among the plurality of partial regions, according to a number of edges extracted by the edge extraction unit in local regions set in each of the one or more partial regions concerned so as to show an image of a road surface between the right and left lane marks of the vehicle traveling road surface (Fourth aspect of the invention).

According to the fourth aspect of the invention, the threshold value for each of the one or more partial regions likely to display the image of the lane marks is updated according to the number of edges extracted by the edge extraction unit in the local regions set for each of the one or more partial regions, in the same manner as the third aspect of the invention.

In this case, the respective local regions of the one or more partial regions are regions set so as to show the image of the road surface between the right and left lane marks of the vehicle traveling road surface. Therefore, the local region is a region having stable pixel values with less noise component or the like.

Therefore, the threshold value for each of the one or more partial regions is able to be appropriately updated with high stability (so as not to be affected by noise component).

Alternatively, in the first or second aspect of the invention, for example, in the case where the monitoring region whose image is taken by the imaging device is a region including a vehicle traveling road surface, the image processing device may further comprises: a lane mark recognition unit configured to recognize an image of lane marks on the vehicle traveling road surface by using the edges extracted by the edge extraction unit in the region targeted for edge extraction including an image of the vehicle traveling road surface; and a threshold updating unit configured to update the threshold values in the one or more respective partial regions, in which at least the image of the lane marks is likely to be shown among the plurality of partial regions, according to a number of edges extracted by the edge extraction unit in local regions set in each of the one or more partial regions concerned so as to shown the image of the lane marks (Fifth aspect, of the invention).

According to the fifth aspect of the invention, the threshold values in the one or more respective partial regions, in which at least the image of the lane marks is likely to be displayed, are updated according to the number of edges extracted by the edge extraction unit in local regions set in each of the one or more partial regions concerned similarly to the third aspect of the invention.

In this case, each of the local regions of the one or more partial regions is set so as to display the image of the lane marks. Therefore, the threshold value in each of the one or more partial regions is able to be updated so as to be a value suitable for extracting the edge corresponding to the lane mark.

In the above fourth aspect of the invention, preferably the threshold updating unit is configured to estimate locations of the lane marks in a new taken image based on positions in the taken image of the lane marks already recognized by the lane mark recognition unit before updating the threshold values and to set the local regions based on the estimation result (Sixth aspect of the invention). The same applies to the fifth aspect of the invention described above (Seventh aspect of the invention).

According to the above sixth or seventh aspect of the invention, the locations of the lane marks are estimated and the local regions are set based on the estimation result. This enables the local regions to be set in required positions with high reliability. Therefore, suitable threshold values are able to be set as threshold values for extracting edges corresponding to the lane marks with high reliability.

DESCRIPTION OF THE PREFERRED EMBODIMENTS

First Embodiment

Figure 1:
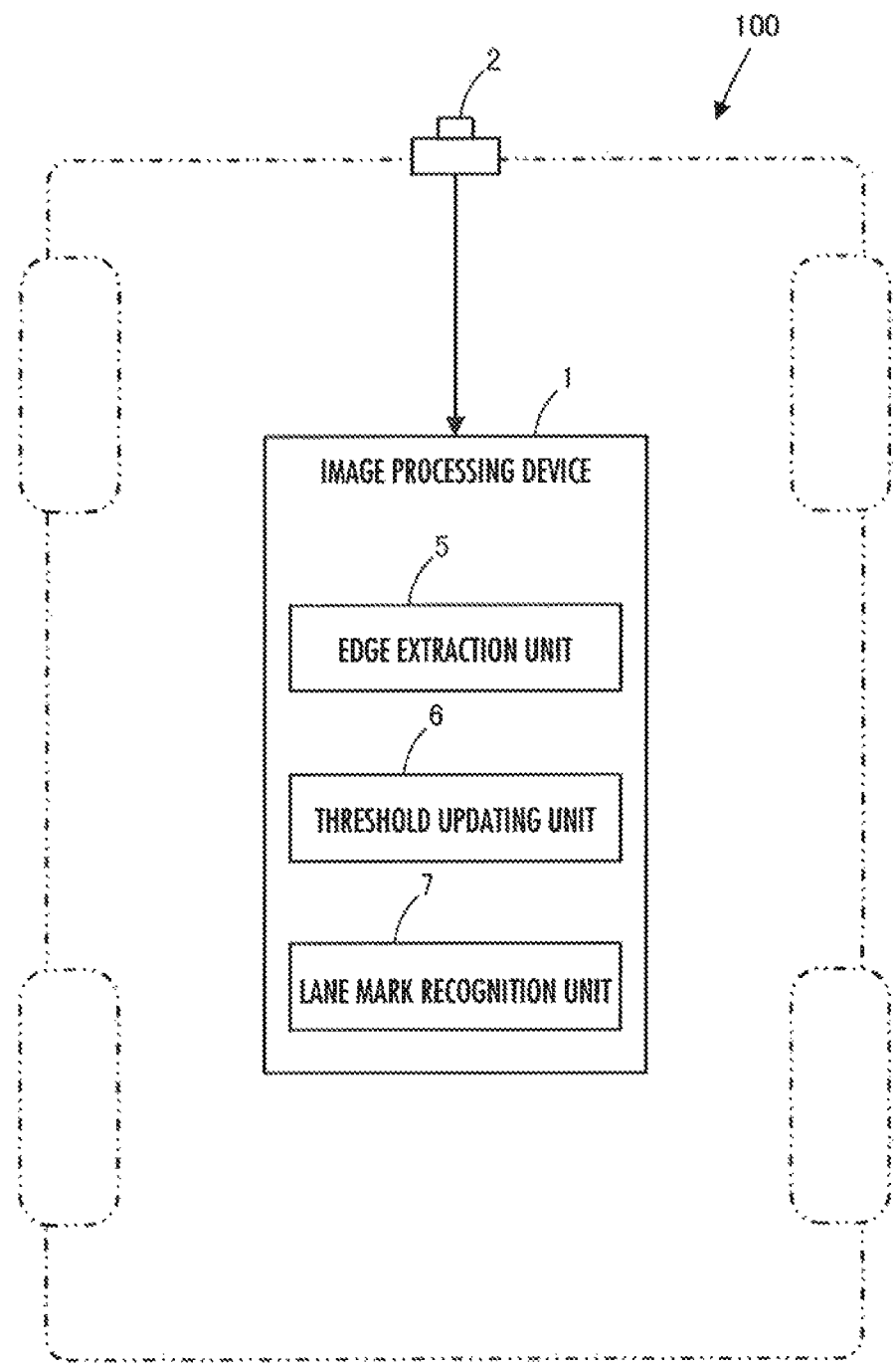
FIG. 1 is a diagram illustrating a system configuration of an image processing device according to an embodiment of the present invention.

A first embodiment of the present invention is described below with reference to FIGS. 1 to 3.

An image processing device 1 of this embodiment is mounted on a vehicle 100 which travels on a road. The image processing device 1 receives an input of an image taken by an imaging device 2 therefrom. Furthermore, the image processing device 1 recognizes a given image to be recognized from the taken image acquired from the imaging device 2. The image to be recognized is a lane mark laid on a road surface (traveling road surface) where the vehicle 100 travels in this embodiment.

The imaging device 2 includes a monocular camera or the like. The imaging device 2 is mounted on the vehicle 100 (hereinafter, referred to as own vehicle 100 in some cases) to take an image of a monitoring region around the own vehicle 100 such as, for example, the front region. The image taken by the imaging device 2 may be either a color image or a monotone image. Additionally, the imaging device 2 is not limited to the monocular camera, but may be a stereo camera composed of two or more cameras, for example.

The image processing device 1 is formed of an electronic circuit unit which includes a CPU, a RAM, a ROM, an interface circuit, and the like. The image processing device 1 is not limited to a single electronic circuit unit, but may be formed of a plurality of electronic circuit units capable of communicating with each other.

The image processing device 1 includes an edge extraction unit 5 which performs processing of extracting edges as candidates for a lane mark from the image taken by the imaging device 2, a threshold updating unit 6 which performs processing of updating (variably setting) a threshold value used for the processing of the edge extraction unit 5, and a lane mark recognition unit 7 which performs processing of recognizing the image of the lane mark by using the edges extracted by the edge extraction unit 5, as functions implemented by installed programs or functions implemented by a hardware configuration.

The edge extraction unit 5, the threshold updating unit 6, and the lane mark recognition unit 7 correspond to an edge extraction unit, a threshold updating unit, a lane mark recognition unit in the present invention, respectively.

Next, the processing of the image processing device 1 is described in detail below.

The image processing device 1 acquires an image taken by the imaging device 2 at a given arithmetic processing cycle and stores and retains the taken images from the current time to a time point before the current time of a given time period in an image memory which is not illustrated.

The image processing device 1 performs processing of the edge extraction unit 5 and processing of the lane mark recognition unit 7 for the taken image acquired at each arithmetic processing cycle.

Figure 2:
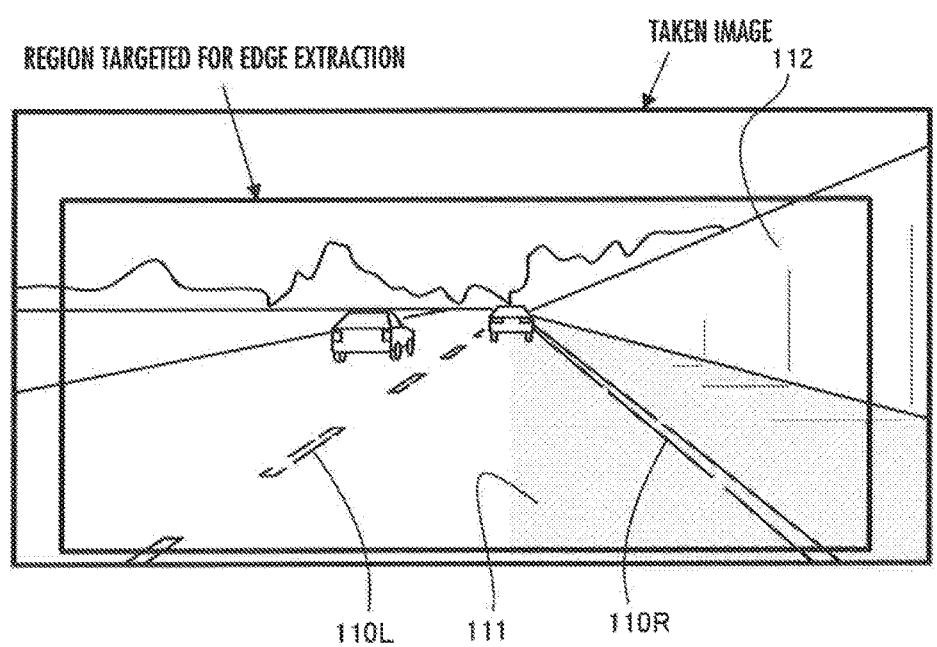
FIG. 2 is a diagram illustrating an example of an image taken by an imaging device 2 illustrated in FIG. 1.

FIG. 2 schematically illustrates an example of a taken image acquired by the imaging device 2. The illustrated taken image is acquired in a situation where the own vehicle 100 is traveling on a traveling road surface 111 between a right lane mark 110R and a left lane mark 110L.

In the illustrated example, the right lane mark 110R is a solid white line and the left lane mark 110L is a broken white line. Moreover, in the illustrated taken image, a dotted region (a region on the traveling road surface 111) represents a shadow region where light is shielded by a fence 112 erected on the right side of the traveling road surface 111. Therefore, the image of the illustrated traveling road surface 111 includes a mixture of a light portion where the luminance is relatively high (a sunny portion) and a dark portion where the luminance is relatively low (a shadow portion).

The edge extraction unit 5 performs processing of extracting edges in a region targeted for edge extraction set as illustrated in FIG. 2 within the taken image. The region targeted for edge extraction is set as a region where the image of a lane mark as it recognition target in this embodiment is likely to exist (in the illustrated example, the rectangular region excluding a portion closer to the peripheral edge of the taken image).

The region targeted for edge extraction may be a predetermined fixed region. According to the circumstances such as the imaging environment, however, it is also possible to appropriately change the size of the region targeted for edge extraction and the arrangement position thereof. Moreover, the entire taken image may be set as a region targeted for edge extraction. Furthermore, the region targeted for edge extraction may be a region having a shape other than the rectangular shape (for example, a trapezoidal shape).

The edge extraction unit 5 creates an edge image representing a change (gradient) in the pixel value (for example, a luminance value) in the horizontal direction for the vertical direction) of the taken image by using a differential filter or the like from the taken image in the region targeted for edge extraction in the edge image, each pixel value increases with an increase in the change gradient of the pixel value of the original taken image.

Incidentally, in the case where the taken image is a color image, it is also possible to use hue or saturation as a pixel value of the taken image to create an edge image based on a change in the hue or saturation.

The edge extraction unit 5 further extracts a pixel whose pixel value is equal to or greater than a given threshold value (in other words, a pixel where the pixel value change in the original taken image is equal to or greater than a given threshold value) in the created edge image as a constituent element of the edge.

In this case, the foregoing threshold value is individually set for each of the plurality of partial regions obtained by dividing (splitting) the region targeted for edge extraction by the processing of the threshold updating unit 6, which is described later, in this embodiment.

Figure 3:
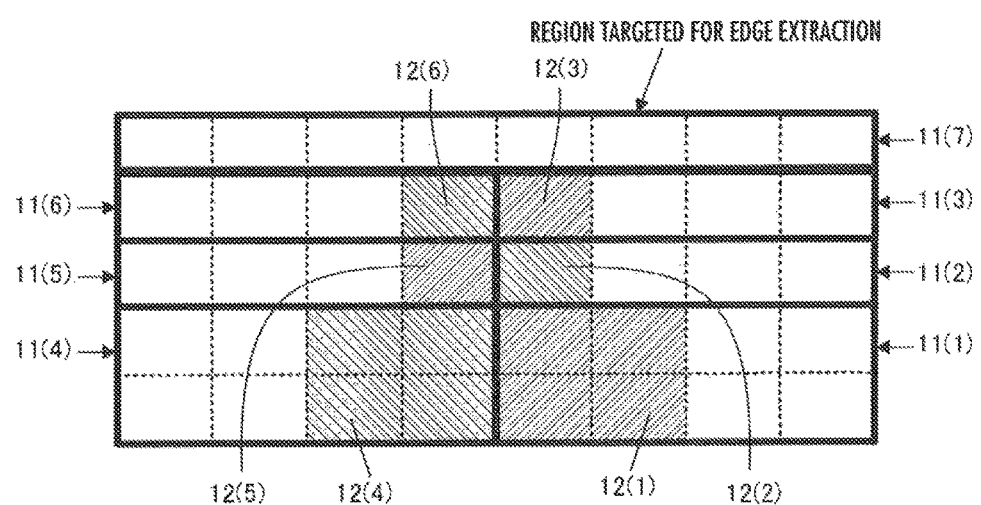
FIG. 3 is a diagram illustrating an arrangement pattern of partial regions and local regions in a first embodiment.

As an example, as illustrated in FIG. 3, the region targeted for edge extraction is divided into seven partial regions 11(1) to 11(7) (regions each enclosed by a thick frame) and different threshold values are individually set for the partial regions 11(1) to 11(7), respectively. The partial regions 11(1) to 11(7) are set as regions (each of which is a region having an area of the integral multiple of a unit region) each including one or more unit regions of a given area (small regions each enclosed by a broken-line frame in FIG. 3) in this embodiment.

Among the foregoing seven partial regions 11(1) to 11(7), the partial regions 11(1), 11(2), and 11(3) are regions vertically arranged in order from the bottom in the right half of the region targeted for edge extraction, the partial regions 11(4) 11(5), and 11(6) are regions vertically arranged in order from the bottom in the left half of the region targeted for edge extraction, and the partial region 11(7) is a region located in the upper end portion of the region targeted for edge extraction on the upper side of the partial regions 11(3) and 11(6).

The right partial regions 11(1), 11(2), and 11(3) of the region targeted for edge extraction are, in other words, regions where the image of the right lane mark 110R is displayed and the left partial regions 11(4), 11(5), and 11(6) are, in other words, regions where the image of the left lane mark 110L is displayed. Moreover, the partial region 11(7) in the upper end portion of the region targeted for edge extraction is a region where mainly a sky image is shown.

The threshold updating unit 6 individually sets different threshold values for edge extraction for the partial regions 11(1) to 11(7), respectively, though the details are described later.

Then, the edge extraction unit 5 performs the edge extraction in the partial regions 11(1) to 11(7) by using the threshold values for the respective partial regions (1) to 11(7). More specifically, in each of the partial regions 11(1) to 11(7), the edge extraction unit 5 extracts a pixel whose pixel value in the edge image is equal to or greater than a threshold value corresponding to each of the partial regions 11(1) to 11(7) as a constituent element of the edge (the edge to be a candidate for an edge of the lane mark) in the partial regions 11(1) to 11(7).

As additional information, in FIG. 3, the position of the boundary line between the right partial regions 11(1), 11(2), and 11(3) of the region targeted for edge extraction and the left partial regions 11(4), 11(5), and 11(6) thereof is the central position in the right and left direction of the region targeted for edge extraction. The position of the boundary line, however, may be set to a position shifted to left or right from the central position.

Subsequently, the image processing device 1 performs processing of the lane mark recognition unit 7 by using the edges extracted by the edge extraction unit 5. In this case, the lane mark recognition unit 7 recognizes the location and direction of the lane mark image in the taken image (the location and direction in the taken image) from the edges continuously arranged on the right and left sides of the own vehicle 100.

For example, the lane mark recognition unit 7 recognizes the location and direction of each of the lane marks 110R and 110L in the taken image illustrated in FIG. 2. Thereafter, the lane mark recognition unit 7 estimates the positional relationship between the own vehicle 100 and the lane mark in the real space based on the location, the direction, or the like of the lane mark recognized in the taken image.

The estimation result may be used, for example, for traveling control (traveling, region control or the like) of the own vehicle 100, for alarm control to the driver, or the like.

Subsequently, the details of the processing of the threshold updating unit 6 are described below. In the following description, a reference character th(i) is employed for the threshold value for edge extraction corresponding to an arbitrary partial region 11(i) (i=1, 2, ... ).

In this embodiment, the threshold updating unit 6 updates the threshold value far edge extraction in each partial region 11(i) (i=1, 2, 3) at a given arithmetic processing cycle. In this case, the arithmetic processing cycle of the processing of the threshold updating unit 6 may be set similarly to the arithmetic processing cycle of the processing of the edge extraction unit 5, for example. The arithmetic processing cycle of the processing of the threshold updating unit 6, however, may be set to a longer cycle than, for example, the arithmetic processing cycle of the processing of the edge extraction unit 5.

Furthermore, the processing of the threshold updating unit 6 may be performed with a change in the imaging environment or the like of the imaging device 2 as a trigger.

In this embodiment, the threshold updating unit 6 sets the threshold value th(i) for edge extraction corresponding to each partial region 11(i) (i=1, 2, 3) to a relatively smaller value as the position of the partial region 11(i) (the position in the taken image) is located more upward (in other words, as a distance from the own vehicle 100 in the road surface portion displayed in the partial region 11(i) is longer), with respect to the right partial regions 11(1), 11(2), and 11(3) of the region targeted for edge extraction. Specifically, these threshold values th(1), th(2), and th(3) are set so as to satisfy th(1)>th(2)>th(3).

Similarly, the threshold updating unit 6 sets the threshold value th(i) for edge extraction corresponding to each partial region 11(i) (i=4, 5, 6) so as to satisfy th(4)>th(5)>th(6), with respect to the left partial regions 11(4), 11(5), and 11(6) of the region targeted for edge extraction.

Note here that the image shown in the partial regions located more upward is a projection image of a portion whose distance from the own vehicle 100 (or from the imaging device 2) is longer. Therefore, the image shown in the partial regions on the upper side tends to be unclear in comparison with the image shown in the partial regions on the lower side. By contrast, the image shown in the partial regions located more downward is a projection image of a portion whose distance from the own vehicle 100 (or from the imaging device 2) is shorter. Therefore, the image shown in the partial regions on the lower side tends to be clear in comparison with the image displayed in the partial regions on the upper side.

Therefore, the threshold values th(1), th(2), and th(3) are set so as to satisfy th(1)>th(2)>th(3) as described above, thereby enabling reliable extraction of the edge of the lane mark (for example, the lane mark 110R illustrated in FIG. 2) shown in each of the partial regions 11(1), 11(2), and 11(3), independently of the distance from the own vehicle 100 (the distance from the imaging device 2).

Similarly, the threshold values th(4), th(5), and th(6) are set so as to satisfy th(4)>th(5)>th(6), thereby enabling reliable extraction of the edge of the lane mark (for example, the lane mark 110L illustrated in FIG. 2) shown in each of the partial regions 11(4), 11(5), and 11(6), independently of the distance from the own vehicle 100 (the distance from the imaging device 2).

In this embodiment, the partial region 11(7) in the upper end portion of the region targeted for edge extraction is basically a region where the image of the lane mark is not shown. Therefore, the threshold value th(7) for edge extraction corresponding to the partial region 11(7) is set to a value sufficiently greater than, for example, other threshold values th(1) to th(6).

More specifically, the threshold values th(1) to th(6) of the partial regions 11(1) to 11(6) are set as described below.

Regarding the threshold value th(i) corresponding to each partial region 11(i) (i=1, 2, ... , 6 of the partial regions 11(1) to 11(6), the threshold value th(i) is set so that the number of extracted edges (the number of pixels extracted as the constituent elements of the edges) coincides with or substantially coincides with the target value determined so as to correspond to the partial region 11(i) in the case of extracting the edges by the processing of the edge extraction unit 5 using the threshold value th(i) in the local region 12(i) included in the partial region 11(i).

In more detail, first, the threshold updating unit 6 sets the local region 12(i) for counting the number of extracted edges for each partial region 11(i) (i=1, 2, ... , 6).

In this case, in this embodiment, the local region 12(i) is set so that the image displayed in the local region 12(i) corresponds to the image of a road surface portion between the lane marks (a road surface portion where no lane mark is laid) on the right and left sides of the own vehicle 100 of the traveling road surface in front of the own vehicle 100.

More specifically, the threshold updating unit 6 estimates an approximate position in which each of the lane marks on the right and left sides of the own vehicle 100 is supposed to be shown in a taken image for which new threshold values for edge extraction are to be set (the threshold values are to be updated) based on the positions (the positions in the taken image) of the right and left lane marks already recognized by the processing of the lane mark recognition unit 7 performed before the current time (for a period from the current time to a time point traced back by a given time).

Incidentally, the threshold updating unit 6 is also allowed to estimate the approximate position in which each of the lane marks is supposed to be shown only from the current taken image according to rules previously determined on an experimental basis.

Then, the threshold updating unit 6 sets the local region 12($i$) corresponding to the partial region 11($i$) ($i$=1, 2, ..., 6) so that the image of the road surface portion between the right and left lane marks is displayed in the local region 12($i$), based on the estimated positions of the lane marks.

As an example, in a situation where the own vehicle 100 is traveling along substantially the central position between the lane marks 110R and 110L illustrated in FIG. 2, for example, the shaded regions 12(1) to 12(6) in FIG. 3 are set as local regions corresponding to the partial regions 11(1) to 11(6), respectively.

The arrangement position and size (area) of each of the regions 12(1) to 12(6) in FIG. 3 are illustrative only. The pattern of the arrangement position and size is not limited to the pattern illustrated in FIG. 3.

For example, the area (or the width or the height) of each of the local regions 12(1) and 12(4) corresponding to the lowermost partial regions 11(1) and 11(4) may be the same as the area of each of the local regions 12(2), 12(3), 12(5), and 12(6) corresponding to the upper partial regions 11(2), 11(3), 11(5), and 11(6), respectively.

Moreover, each of the local regions 12(1), 12(2), and 12(3) of the right partial regions 11(1), 11(2), and 11(3) may have a different size from that of each of the local regions 12(4), 12(5), and 12(6) of the left partial regions 11(4), 11(5), and 11(6). Alternatively, an appearance other than the symmetric one may be adopted for the arrangement positions of each of the local regions 12(1), 12(2), and 12(3) of the right partial regions 11(1), 11(2), and 11(3) and the arrangement positions of each of the local regions 12(4), 12(5), and 12(6) of the left partial regions 11(4), 11(5), and 11(6).

Moreover, one of the local regions 12(1) to 12(6) may be a region smaller than the unit region described above.

Furthermore, the threshold updating unit 6 sets the threshold value th($i$) for edge extraction to a plurality of previously-determined candidate values within a given range (for example, values different from each other by a given value α such as th, th+α, th+2·α, th+3·α, ..., th+n·α) in order in the local region 12($i$) of each partial region 11($i$) ($i$=1, 2, ..., 6) and performs the same processing as the edge extraction unit 5 by using the threshold value th($i$) of each candidate value in the above to count the number of extracted edges N(th($i$)) extracted in the local region 12($i$) so as to correspond to the threshold value th($i$) of each candidate value.

Moreover, the threshold updating unit 6 sets a target value for the number of extracted edges for each local region 12($i$) of the partial region 11($i$) ($i$=1, 2, ... 6). In this case, the target value of the number of extracted edges per unit area is previously set based on an experiment or the like for each partial region 11($i$) ($i$=1, 2, ..., 6). Then, the threshold updating unit 6 sets the target value of the number of extracted edges in each local region 12($i$) to a value obtained by multiplying the target value per unit area by the area of the local region 12($i$).

Thereafter, the threshold updating unit 6 selects a candidate value which causes the number of extracted edges N(th($i$)) to be closest to the target value set so as to correspond to the local region 12($i$) out of the candidate values of the threshold value th($i$) in each local region 12($i$) ($i$=1, 2, ..., 6), as a threshold value MO) of the entire partial region 11($i$).

In this case, under the requirement that the number of extracted edges N(th($i$)) is equal to or less than the target value, the threshold updating unit 6 also may select a candidate value which causes the number of extracted edges N(th($i$)) to be maximum out of the candidate values satisfying the requirement, as a threshold value th($i$) of the partial region 11($i$).

Alternatively, under the requirement that the number of extracted edges N(th($i$)) is equal to or more than the target value, the threshold updating unit 6 also may select a candidate value which causes the number of extracted edges N(th($i$)) to be minimum out of the candidate values satisfying the requirement, as a threshold value th($i$) of the partial region 11($i$).

As additional information, the target value of the number of extracted edges per unit area in each partial region 11($i$) ($i$=1, 2, ... 6) is set so that the threshold values th(1) to th(6) selectively determined as described above satisfy th(1)>th(2)>th(3) and th(4)>th(5)>th(6) in this embodiment.

Regarding the partial region 11(7) in the upper end portion of the region targeted for edge extraction, the threshold value th(7) therefor is set to a given value previously determined in this embodiment. The threshold value th(7), however, also may be variably set so that the number of extracted edges in the partial region 11(7) coincides with or substantially coincides with a given target value.

As described hereinabove, the threshold values th(1) to th(7) set so as to correspond to the partial regions 11(1) to 11(7) are used in processing in the current arithmetic processing cycle of the edge extraction unit 5 or in processing in the next or subsequent arithmetic processing cycles thereof.

According to this embodiment described hereinabove, threshold values th($i$) different from each other are set for the respective partial regions 11($i$) ($i$=1, 2, ... ) of the region targeted for edge extraction of the taken image. This enables an edge to be extracted by using the threshold value th($i$) appropriate to extract the edge for each partial region 11($i$) ($i$=1, 2, ... ). Consequently, it is possible to prevent an occurrence of a situation where a required edge (an edge of a lane mark in this embodiment) cannot be extracted in each partial region 11($i$) or where a number of extra edges are extracted.

For example, even in the case where a relatively dark shadow portion and a relatively light sunny portion are mixed on the traveling road surface 111 as illustrated in FIG. 2, the edge of the lane mark 110R or 110L is able to be appropriately extracted in each partial region 11($i$) ($i$=1, 2, ... ).

In this manner, required edges can be extracted with high reliability.

Moreover, in this embodiment, the threshold value th($i$) in each partial region 11($i$) ($i$=1, 2, ..., 6) of the partial regions 11(1) to 11(6) where the image of the lane mark is likely to be shown is set according to the number of extracted edges in the local region 12($i$) which is set so that the portion between the right and left lane marks is displayed. This enables appropriate setting of a reliable threshold value th($i$) so as to be insusceptible to a noise component in the taken image.

Furthermore, the threshold value th($i$) in each partial region 11($i$) ($i$=1, 2, ..., 6) of the partial regions 11(1) to 11(6) is set according to the number of extracted edges in the local region 12($i$) which is a part of the partial region 11($i$). This enables efficient setting processing of the threshold value th($i$) with a small arithmetic load.

Second Embodiment

Subsequently, a second embodiment of the present invention is described with reference to FIG. 4. This embodiment differs from the first embodiment only in the processing of the threshold updating unit 6. Therefore, the description of this embodiment is focused on the matters different from those of the first, embodiment and the description of the same matters as the first embodiment is omitted.

In this embodiment, the threshold updating unit 6 sets the local region 12($i$) for which the number of extracted edges in each partial region 11($i$) ($i$=1, 2, . . . , 6) of the partial regions 11(1) to 11(6) is counted among the partial regions 11(1) to 11(7) of the region targeted for edge extraction, in a mode different from the first embodiment.

In this embodiment, the local region 12($i$) is set so that the image of either one of the lane marks on the right and left sides of the own vehicle 100 on the road surface in front of the own vehicle 100 is displayed in the local region 12($i$).

More specifically, the threshold updating unit 6 estimates a position in which either one of the lane marks on the right and left sides of the own vehicle 100 is supposed to be displayed in a taken image for which new threshold values for edge extraction are to be set (the threshold values are to be updated) based on the positions (the positions in the taken image) of the right and left lane marks already recognized by the processing of the lane mark recognition unit 7 performed before the current time (for a period up to a time point traced back by a given time from the current time).

Thereafter, the threshold updating unit 6 sets the local regions 12(1), 12(2), and 12(3) so that the right lane mark is displayed in the local regions 12(1), 12(2), and 12(3) of the respective partial regions 11(1), 11(2), and 11(3) on the right side, based on the estimated position of the right lane mark.

Similarly, the threshold updating unit 6 sets the local regions 12(4), 12(5), and 12(6) so that the left lane mark is displayed in the local regions 12(4), 12(5), and 12(6) of the respective partial regions 11(4), 11(5), and 11(6) on the left side, based on the estimated position of the left lane mark.

Figure 4:
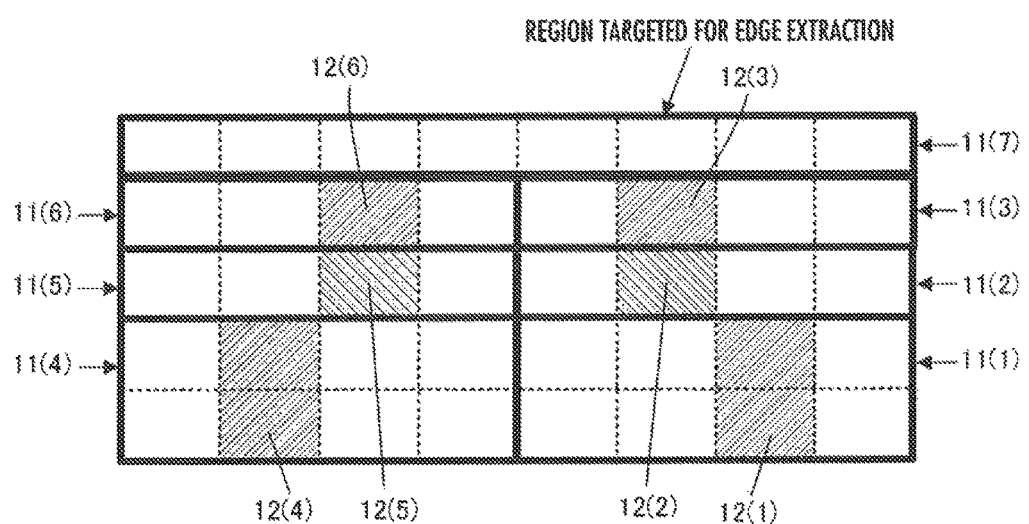
FIG. 4 is a diagram illustrating an arrangement pattern of partial regions and local regions in a second embodiment.

As an example, in a situation where the own vehicle 100 is traveling along substantially the central position between the lane marks 110R and 110L illustrated in FIG. 2, for example, the shaded regions 12(1) to 12(6) in FIG. 4 are set as local regions corresponding to the partial regions 11(1) to 11(6), respectively.

The arrangement position and size (area) of each of the regions 12(1) to 12(6) in FIG. 4 are illustrative only. The pattern of the arrangement position and size is not limited to the pattern illustrated in FIG. 4. For the pattern of the arrangement position and size, various patterns may be used in the same manner as in the description of the first embodiment.

This embodiment is the same as the first embodiment except the matters described above.

In this embodiment, similarly to the first embodiment, an edge is able to be extracted by using the threshold value th($i$) appropriate to extract an edge for each partial region 11($i$) ($i$=1, 2, . . . ). Consequently, a required edge (an edge of the lane mark in this embodiment) is able to be extracted in each partial region 11($i$) with high reliability.

Moreover, in this embodiment, the threshold value th($i$) in each partial region 11($i$) ($i$=1, 2, . . . , 6) of the partial regions 11(1) to 11(6) where the image of the lane mark is likely to be displayed is set according to the number of extracted edges in the local region 12($i$) which is set so that the right or left lane mark is displayed. This enables the setting of the threshold value th($i$) suitable for extracting the edge of the lane mark.

Furthermore, similarly to the first embodiment, the threshold value in each partial region 11($i$) ($i$=1, 2, . . . 6) of the partial regions 11(1) to 11(6) is set according to the number of extracted edges in the local region 12($i$) which is a part of the partial region 11($i$). This enables efficient setting processing of the threshold value th($i$) with a small arithmetic load.

MODIFICATIONS

The following describes some modifications relating to the embodiments described hereinabove.

In each of the above embodiments, the number of partial regions 11($i$) ($i$=1, 2, . . . ) in the region targeted for edge extraction and the arrangement position and size of each partial region 11($i$) are fixed. Note that, however, the number of partial regions, the arrangement pattern of the partial regions, and the size of each partial region may be appropriately changed according to the traveling environment (moreover, the imaging environment) of the own vehicle 100.

Moreover, in each of the above embodiments, the description has been made by giving an example of extracting edges of the lane marks on the traveling road surface. The present invention, however, is also applicable to a case of extracting edges of an object such as another vehicle from a taken image.

Furthermore, the imaging device 2 is not limited to the imaging device 2 previously mounted on the vehicle 100. For example, it is also possible to adopt, as the imaging device 2, an imaging device which can be carried by a driver or an imaging device mounted on an arbitrary mobile body or the like other than the vehicle 100.

What is claimed is:

1. An image processing device comprising an imaging device mounted on a vehicle and an electronic circuit unit including a processor, wherein each frame of an image taken by the imaging device includes a first partial region and a second partial region respectively occupying two non-overlapping parts of the image, and with each of the first and second partial regions consisting of pixels arranged in longitudinal and cross directions in the image, and wherein the processor is configured to provide:

a first threshold setting unit which sets a first threshold value for the first partial region, based on a characteristic of the first partial region;

a second threshold setting unit which sets the second threshold value for a second partial region, based on a characteristic of the second partial region;

a first edge extraction unit which extracts an edge from the first partial region by comparing a pixel value change in the in the first partial region with the first threshold value; and a second edge extraction unit which extracts an edge from the second partial region by comparing a pixel value change in the second partial region with the second threshold value, wherein the first threshold value setting unit updates the first threshold value determined based on a number of edges extracted by the first edge extraction unit, and the second threshold setting unit updates the second threshold value determined based on a number of edges extracted by the second edge extraction unit, wherein the image includes a vehicle traveling road surface and both the first and second partial regions are regions of the vehicle traveling road surface.

2. The image processing device according to claim 1, wherein the first threshold for the first partial region where an image of a portion which is at a relatively long distance from the imaging device in a real space is projected is smaller than the second threshold value for the second partial region where an image of a portion which is at a relatively short distance from the imaging device is projected.

3. An image processing device comprising an imaging device mounted on a vehicle and an electronic circuit unit including a processor,
wherein each frame of an image taken by the imaging device includes a first partial region and a second partial region respectively occupying two non-overlapping parts of the image, and with each of the first and second partial regions consisting of pixels arranged in longitudinal and cross directions in the image, and
wherein the processor is configured to provide:
a first threshold setting unit which sets a first threshold value for the first partial region, based on a characteristic of the first partial region;
a second threshold setting unit which sets the second threshold value for a second partial region, based on a characteristic of the second partial region;
a first edge extraction unit which extracts an edge from the first partial region by comparing a pixel value change in the in the first partial region with the first threshold value; and
a second edge extraction unit which extracts an edge from the second partial region by comparing a pixel value change in the second partial region with the second threshold value,
wherein the image includes a vehicle traveling road surface and both the first and second partial regions are regions of the vehicle traveling road surface, and
wherein the processor is further configured to provide:
a lane mark recognition unit configured to recognize an image of lane marks on the vehicle traveling road surface by using the edges extracted by the edge extraction unit corresponding to the region targeted for edge extraction including an image of the vehicle traveling road surface, wherein
the first threshold setting unit updates the first threshold value for the first partial region, in which at least the image of the lane marks is likely to be shown, determined based on a number of edges extracted by the first edge extraction unit in a local region set in the first partial region concerned so as to show an image of a road surface between the right and left lane marks of the vehicle traveling road surface, and
the second threshold setting unit updates the second threshold value for the second partial region, in which at least the image of the lane marks is likely to be shown, determined based on a number of edges extracted by the second edge extraction unit in a local region set in the second partial region concerned so as to show and image of a road surface between the right and left lane marks of the vehicle traveling road surface.

4. An image processing device comprising an imaging device mounted on a vehicle and an electronic circuit unit including a processor,
wherein each frame of an image taken by the imaging device includes a first partial region and a second partial region respectively occupying two non-overlapping parts of the image, and with each of the first and second partial regions consisting of pixels arranged in longitudinal and cross directions in the image, and
wherein the processor is configured to provide:
a first threshold setting unit which sets a first threshold value for the first partial region, based on a characteristic of the first partial region;
a second threshold setting unit which sets a second threshold value for the second partial region, based on a characteristic of the second partial region;
a first edge extraction unit which extracts an edge from the first partial region by comparing a pixel value change in the in the first partial region with the first threshold value; and
a second edge extraction unit which extracts an edge from the second partial region by comparing a pixel value change in the second partial region with the second threshold value,
wherein the image includes a vehicle traveling road surface and both the first and second partial regions are regions of the vehicle traveling road surface, and
wherein the processor is further configured to provide:
a lane mark recognition unit configured to recognize an image of lane marks on the vehicle traveling road surface by using the edges extracted by the edge extraction unit corresponding to the region targeted for edge extraction including an image of the vehicle traveling road surface, wherein
the first threshold setting unit updates the first threshold value for the first partial region, in which at least the image of the lane marks is likely to be shown, determined based on a number of edges extracted by the first edge extraction unit in a local region set in the first partial region concerned so as to show the image of the lane mark, and
the second threshold setting unit updates the second threshold value for the second partial region, in which at least the image of the lane marks is likely to be shown, determined based on a number of edges extracted by the second edge extraction unit in a local region set in the second partial region concerned so as to show the image of the lane mark.

5. The image processing device according to claim 3, wherein at least one of the first and second threshold setting units is configured to estimate locations of the lane marks in a frame of another image from the imaging device based on positions in the image of the lane marks ahead recognized by the lane mark recognition unit before updating at least one of the first and second threshold values and to set the local region based on the estimation result.

6. The image processing device according to claim 4, wherein at least one of the first and second threshold setting units is configured to estimate locations of the lane marks in a frame of another image from the imaging device based on positions in the image of the lane marks ahead recognized by the lane mark recognition unit before updating at least one of the first and second threshold values and to set the local region based on the estimation result.

7. The image processing device according to claim 3, wherein the first threshold for the first partial region where an image of a portion which is at a relatively long distance from the imaging device in a real space is projected is smaller than the second threshold value for the second partial region where an image of a portion which is at a relatively short distance from the imaging device is projected.

8. The image processing device according to claim 4, wherein the first threshold for the first partial region where an image of a portion which is at a relatively long distance from the imaging device in a real space is projected is smaller than the second threshold value for the second partial region where an image of a portion which is at a relatively short distance from the imaging device is projected.

9. The image processing device according to claim 1, wherein the updating based on the number of edges of at least one of the first and second threshold values is performed only for the respective partial region with the respective threshold value or less.

10. The image processing device according to claim 3, wherein the updating based on the number of edges of at least one of the first and second threshold values is performed only for the respective partial region with the respective threshold value or less.

11. The image processing device according to claim 4, wherein the updating based on the number of edges of at least one of the first and second threshold values is performed only for the respective partial region with the respective threshold value or less.

12. The image processing device according to claim 1, wherein the first and second partial regions are arranged horizontally to each other.

13. The image processing device according to claim 3, wherein the first and second partial regions are arranged horizontally to each other.

14. The image processing device according to claim 4, wherein the first and second partial regions are arranged horizontally to each other.

* * * * *